United States Patent [19]
van de Goor et al.

[11] 4,082,945
[45] Apr. 4, 1978

[54] DOCUMENT PROCESSING DEVICE

[75] Inventors: Adrianus Johannes van de Goor, Wilnis; Hans Pijlman, Nieuwveen; Bernard Evert van der Vleugel, Harmelen, all of Netherlands

[73] Assignee: International Business Machines Corporation, Armonk, N.Y.

[21] Appl. No.: 799,629

[22] Filed: May 23, 1977

[30] Foreign Application Priority Data

Jun. 30, 1976 Netherlands .................. 7607250

[51] Int. Cl.² .............. G06F 7/02; G06K 3/12; G06K 7/08; B65H 5/22
[52] U.S. Cl. ................. 235/419; 271/3; 101/93; 235/449
[58] Field of Search ............... 101/93 C, 72; 340/146.3 Z; 235/61.6 J, 61.7 R, 61.7 A, 61.11 R, 61.9 R, 61.9 A; 271/3; 250/569; 360/2, 81; 346/75

[56] References Cited

U.S. PATENT DOCUMENTS

| 3,034,782 | 5/1962  | Weidenhammer | 271/3      |
|-----------|---------|--------------|------------|
| 3,519,801 | 7/1970  | Nielsen      | 235/61.6 R |
| 3,614,091 | 10/1971 | Bernardis    | 271/52     |
| 3,659,524 | 5/1972  | Beery        | 101/93 MN  |
| 3,703,628 | 11/1972 | Philipson    | 235/61.9 R |
| 3,946,205 | 3/1976  | Melvgin      | 235/61.11 R|
| 4,027,142 | 5/1977  | Paup         | 235/61.9 R |

FOREIGN PATENT DOCUMENTS

| 2,250,451 | 5/1975 | France.      |
|-----------|--------|--------------|
| 2,284,931 | 4/1976 | France.      |
| 1,549,951 | 7/1971 | Germany.     |
| 6,610,529 | 7/1966 | Netherlands. |
| 6,801,931 | 1/1968 | Netherlands. |

*Primary Examiner*—Robert M. Kilgore
*Attorney, Agent, or Firm*—Paul M. Brannen

[57] ABSTRACT

A document processing device for performing separate operations on at least two different kinds of documents, such as bills and associated vouchers, or orders for payment such as checks, provided with transport means for moving documents of a first kind, the bills, in a continuous movement along at least a reading station, and with transport means for moving documents of a second kind, the checks, stepwise along at least an encoding station.

11 Claims, 7 Drawing Figures

4,082,945

DOCUMENT PROCESSING DEVICE

BACKGROUND OF THE INVENTION

1. Field of the Invention

This invention relates to document processing devices and particularly to an improved document processing device for expeditiously processing a first kind of document, such as bills, and a second kind of document, such as checks for payment of the bills.

2. Description of the Prior Art the known and commercially available devices are characterized by separate transport paths for different kinds of documents, each of the transport paths being provided with its own document input. This is attended by the drawback that either an operator has to use both hands for alternately introducing two kinds of documents into the device if the two document inputs are far apart, or, if the two inputs are located closely together and the operator has to place a document in one input and a following document in another input alternately, the chance of errors, i.e., the placing of a document in the wrong input, is relatively large. An additional drawback is that with the inputs relatively far apart, the operator has to introduce documents and to actuate a keyboard with one and the same hand, i.e., the right hand. A further drawback of known devices with separate transport paths is that if it is desirable to print complementary information on different documents, a separate printing station is required for each of these transport paths.

SUMMARY OF THE INVENTION

The principal object of the invention is to eliminate the existing drawbacks, for which purpose the document processing device is characterized in that a single transport path for at least two kinds of documents is provided, which is equipped with a single transport drive for selective, continuous or intermittent propagation of documents past processing stations disposed along the transport path, such as a reading station, an encoding station, a printing station, and an endorsing station, and a control unit for selectively controlling the various processing stations and the associated movement of the documents in dependence on the documents supplied, which are alternately of a different nature.

Another object of the invention is to provide a document processing device of the type described in which the manual operation of document feeding to the device is minimized.

A further object of the invention is to provide a document processing device of the type described in which the through-put of the documents is increased over known devices.

With the device according to the invention the drawbacks of the prior art are eliminated because the same transport path is used for different kinds of documents, so that the device requires only one input. Thus an operator can successively place different documents in the input with one hand, the left hand, leaving the other hand, the right hand, free for keying in data. All the documents being moved forward in the same transport path, one printing station will suffice for printing complementary data on documents of different kinds.

To drive the transport path a step motor is used, which on the one hand can impart a substantially continuous velocity to the transport means, such as rolls and belts, and on the other hand can subject the document transport means to an extremely accurate angular rotation or translation. The step motor is energized by means of pulses and/or pulse trains delivered by the control unit.

The speed at which an operator works being many times smaller than that of the control unit, it is advantageous to have two operator consoles, i.e., two separate document processing devices, controlled by a single control unit. The two processing devices and the associated control unit may be combined to form one unit.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
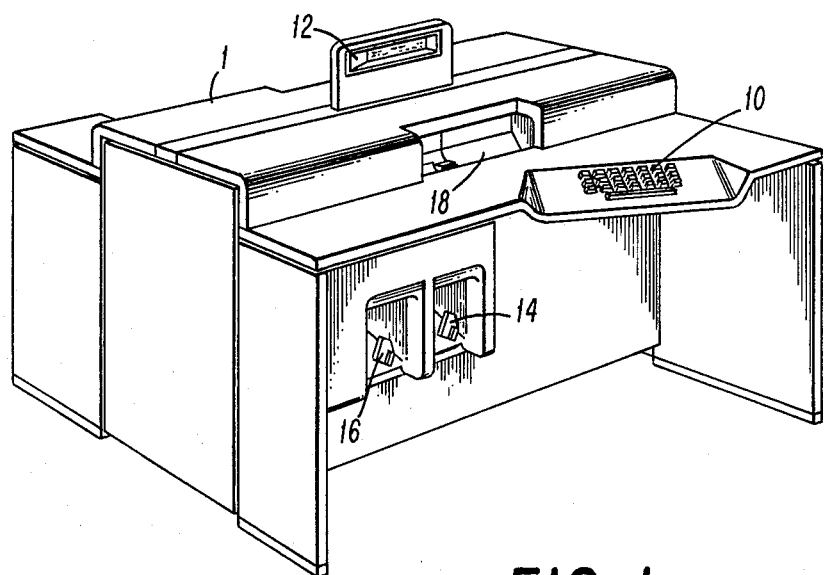
FIG. 1 is a perspective view of a device according to the invention.

FIG. 1 shows a perspective view of a housing 1, accommodating two document processing devices according to the invention; on the outside of the housing the following functional components of each of the two devices are visible: a keyboard 10, a display unit 12, a first and second document stacker 14, 16, respectively, and a document input 18.

An embodiment of the device according to the invention will be described with reference to an application for which each time one or more bills and an associated check are to be processed. An operator places a bill in the input of the device. When the device is initially made operative, the first document it expects is a bill. If it is established that a document has been placed in the input, it is gripped by a transport mechanism and carried past a plurality of processing stations. The first station is an optical reader, reading a number of data from the bill, such as the amount to be paid, client number, article number, etc. These data are passed on to a control unit, which may be a small computer. The control unit can communicate relevant data, such as the amount to be paid, or instructions, directions, etc., to the operator by making such data visible on the display 12.

As soon as the operator has placed a bill in the input, he takes the next document, generally the check associated with the document just placed in the input, keys in the amount indicated thereon on the keyboard and subsequently places the check in the input. The input is designed so that when the check has been placed in the input, the amount indicated remains visible to the operator.

After all the relevant data have been read from the first document, the bill, it is stopped and the control unit sets the device to expect the next document to be a check and compares the amount read from the bill with what has been keyed in by the operator. If the two amounts appear to be equal, if so desired within predetermined limits, the control unit energizes the transport mechanism, in consequence whereof the first document, the bill, is transported to the next processing station and the second document, the check, is fed into the device. If no agreement is established between the amounts, the control unit signals this to the operator by means of the display, who will then have to take appropriate action. In this case the transport mechanism will remain blocked until the discrepancy has been eliminated, or the transaction will be cancelled.

If the two amounts agree, or if a correction has been made, the first document, the bill, reaches the next processing station, which may be a printing station. Under control of the control unit the printing station prints, preferably on the back of the bill, a number of data, such as the processing date, a consecutive number, an operator code and/or a group number.

The reading station not being activated for a check, the first processing station of importance for a check is an encoding device for applying data in machine readable form; the control unit has the encoding device print data, such as amount, firm number and/or group number, on the check in standardized optically or magnetically readable characters.

After the second document, the check, has left the encoding station and reached the printing station, it is possible to print complementary data thereon under control of the control unit. Subsequently, the check reaches an endorsing station, where, again under control of the control unit, a day and/or firm stamp may be printed on the check.

During the processing of the second document, the check, the first document, the bill, has reached a selecting station or selector, where the transport path divides to end up in two stackers. The selector is set so that the first document is guided to the first stacker; when this document has passed the selector, a sensor signals this to the control unit, which subsequently switches the selector to send the next document to the second stacker.

It will repeatedly occur that a client sends his creditor more than one bill but only one check for the total amount. In such a case a bill placed in the input after the first one should not be processed by the device as a check. For this purpose the operator actuates a special function key on the keyboard before placing the second, third, and possibly more bills in the input. As soon as a document is placed in the input without actuation of the special function key, the control unit signals the device that it may now expect a check.

Figure 2A:
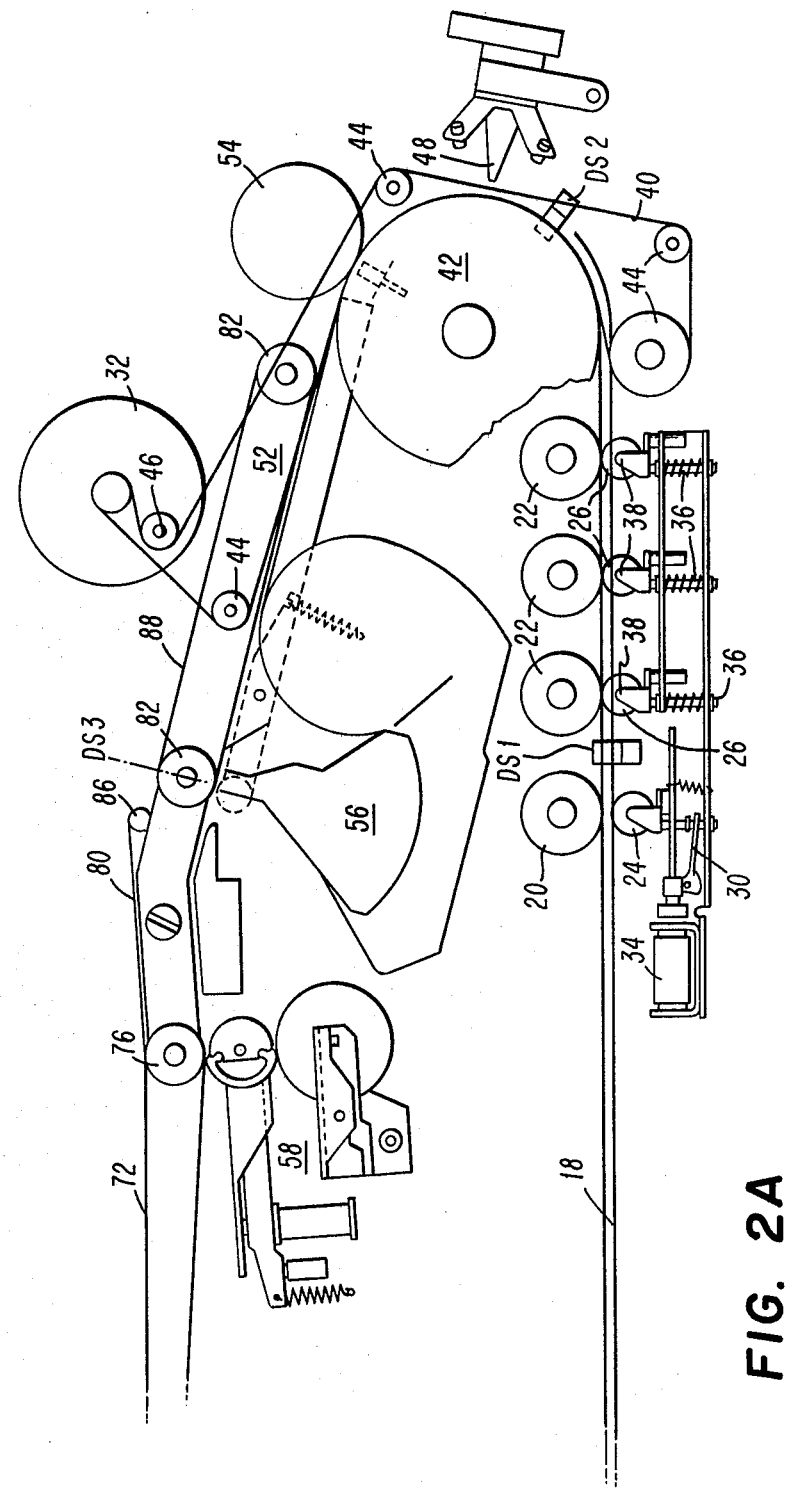
FIG. 2A shows the primary portion of the transport path of the device according to the invention with the processing stations located alongside it.
Figure 2B:
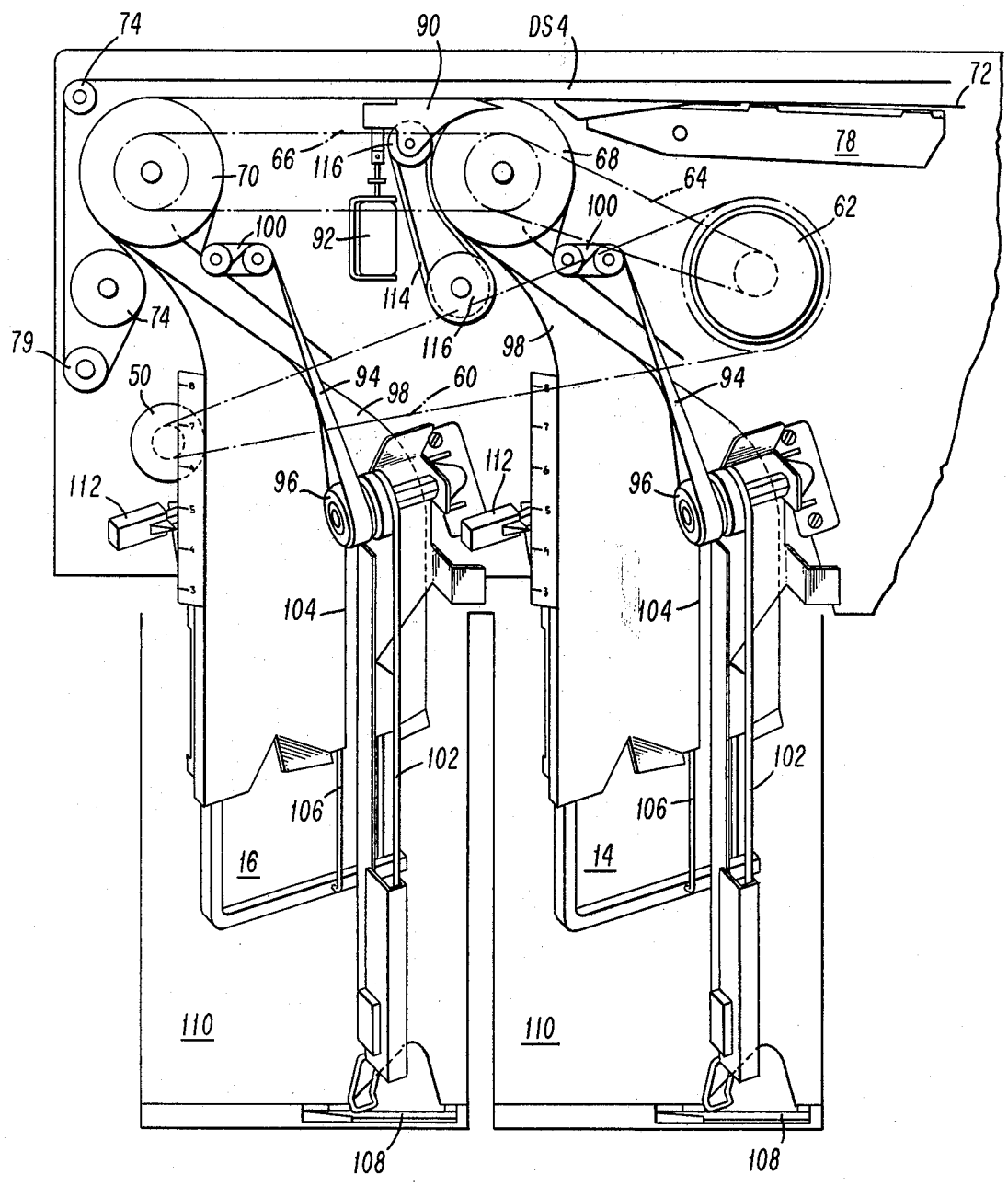
FIG. 2B shows the secondary portion of the transport path of the device according to the invention with stackers and a selecting mechanism therefor.

FIGS. 2A and 2B, taken together with FIG. 2B on the left, show the document transport path, the arrangement of the various processing stations alongside it, the stackers, the keyboard, the display panel and the control unit.

The document transport path begins at input 18. Input 18 comprises at least a drive roll 20 and a number of aligning rolls 22, and corresponding, resiliently disposed, freely rotating pressure wheels 24, 26. Furthermore input 18 is provided with a document sensor DS1, which may comprise a combination of a light source and a photosensitive element. A document placed in the input activates document sensor DS1, which signals this to control unit 28. Driving pressure wheel 24 is disposed in a translatable frame 30 and is at some distance from drive roll 20 when in the rest state. When the control unit has received the signal from the document sensor, it starts a transport drive motor 32 and energizes means 34, such as an electromagnet, which displaces frame 30, so that the document is pressed against drive roll 20 by pressure wheel 24 and starts moving in the direction of the aligning rolls. The rolls 20 and 22 are all driven by motor 32.

The pressure wheels 26 in the aligning station are pivotable on an axis 36 which is perpendicular to their axis of rotation 38. The pressure wheels 26 are biased so that when a document moves through the aligning station, the wheels 26 impart a downward displacement to the document until the bottom edge of the document slides on a reference plane or edge, not shown. Now the document is aligned with respect to the various processing stations.

When the document leaves the aligning station, the drive of the document is taken over by a transport belt 40, likewise driven by motor 32. Belt 40 clamps the document against a drum 42. The belt is guided on and tensioned by guide rolls 44 and a tensioning roll 46, respectively.

Figure 3:
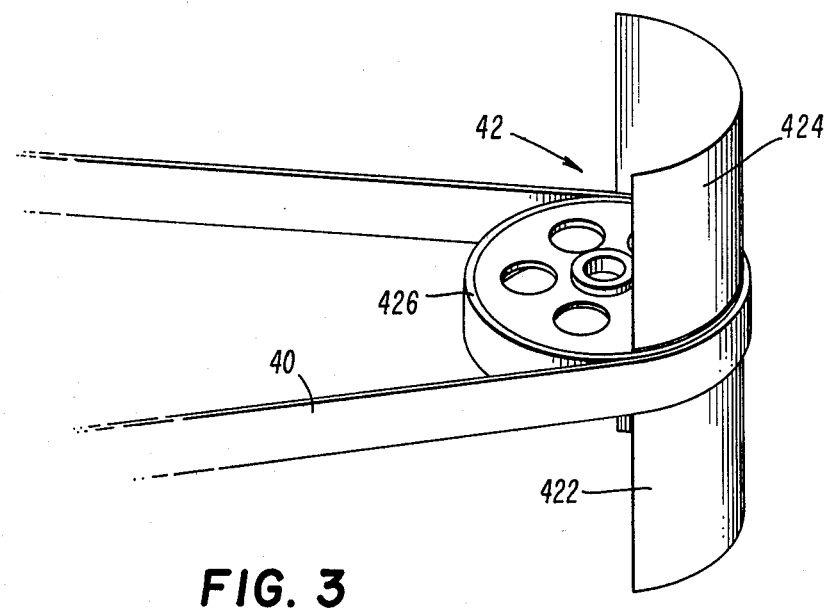
FIG. 3 shows a perspective view of a document guiding drum in the primary portion of the transport path according to FIG. 2A.

FIG. 3 shows an embodiment of drum 42. In order to reduce the inertia and not to use too much space unnecessarily, drum 42 is embodied as two segments 422 and 424 of a cylinder barrel disposed on top of each other, with a runner wheel 426 in between, its width corresponding with that of transport belt 40 and its diameter with that of the cylinder.

After some time the document reaches a second document sensor DS2 (FIG. 2A) and activates it. Document sensor DS2 signals the appearance of the leading edge of the document to control unit 28, which thereupon stops motor 32. Subsequently the control unit investigates whether its internal recognition logic is available and ready, and if so, activates reading station 48 and restarts motor 32. Generally reading station 48 will be an optical reader. A scanner with associated recognition logic suitable for reading station 48 is that shown and described in the manuals for the IBM 1275 "Optical Reader Sorter".

By means of transport belt 40 motor 32 carries the document at a constant velocity past reading station 48. Scanner 48 scans the characters to be read on the document and supplies the resulting video signal information to control unit 28. The digitalization of the video signals may be effected in the reading station itself or in the control unit. The control unit performs recognition operations on the digitalized video data and checks the validity of the data read, i.e., if all the characters read have been uniquely identified, the number lengths are as specified, etc. In case of a discrepancy the control unit signals this to the operator via display 12 and removes the document from the device.

When the trailing edge of the document passes document sensor DS2, it is deactivated, DS2 signaling this to the control unit. By means of an internal timing circuit control unit 28 now has motor 32 run long enough so that the trailing edge of the document has moved away a definite distance, e.g., 5 cm, from document sensor DS2 and then stops the motor.

In the meantime the operator will have passed on to control unit 28, by means of keyboard 10, the amount read by him from the next document, the check, and, by means of depressing a key designated ENTRY/RELEASE, will have instructed the control unit to continue the processing of the present pair of documents. Control unit 28 now compares the amount read from the first document, the bill, with the amount keyed in by the operator. If agreement is established, possibly within certain limits, the control unit investigates the state of document sensor DS1 to establish the presence or absence of the second document in the input. If the second document has been or is placed in input 18, control unit 28 starts motor 32, so that the first document starts moving again and the second is gripped by transport belt 40.

If upon comparison of the amount read and keyed in, no agreement is established, control unit 28 signals this to the operator by means of display 12, removes the first document from the device and refuses to accept the second document. A suitable display panel is a gas discharge display panel, for example, as disclosed in U.S. Pat. No. 3,559,190.

When the check has been accepted, the leading edge thereof will activate document sensor DS2. As soon as the change of state of document sensor DS2 is signaled to control unit 28, it starts an internal timing circuit, which causes motor 32 to run until the leading edge of the check has reached encoding station 54 and then stops the motor.

In the meantime the first document has disappeared from the portion of the transport path driven by motor 32. After motor 32 began rotating again due to the second document being placed in the input, the first document arrived in the transitional area between the primary portion of the transport mechanism driven by motor 32 and the secondary portion driven by a motor 50 (FIG. 2B). The transitional area comprises a second aligning station 52, for which a suitable aligning device may be used. An aligning station is desirable when a document passes from one portion of a transport path to another one, when the two portions are driven by separate motors and/or when the transport means of the two parts do not act upon the document in one line, so that a torque is caused in the document plane. the driving/aligning means of station 52 may slip in respect of the document, so that transport belt 40 keeps control of the document movement until the moment belt 40 and the document lose contact, whereupon the document movement is controlled by the transport mechanism portion driven by motor 50.

As already described in the foregoing, control unit 28 has stopped a document, the check, in the first part of the transport, and in such a way that the leading edge of the document is positioned slightly past the printing position of encoding station 54. Subsequently the control unit investigates whether its internal logic is available for carrying out an encoding operation and/or if a following document, the bill of the next transaction, has been placed in input 18 (activating condition of document sensor DS1). If these two conditions are satisfied, control unit 28 causes encoding station 54 to print the first character of the data to be encoded on the document. Generally the information to be encoded is constituted only by the amount, but also complementary data, such as a firm number and/or the like may be printed and is applied to the document in standardized characters, adapted to be read by an optical or magnetic reader, such as the OCR-A-, the OCR-B-, and the E13B-, CMC7-script, respectively. Each time the encoding station has printed a character, control unit 28 moves the document an accurately determined distance by energizing motor 32 during a definite time, in order to be able to print each character at the correct distance in respect of its predecessor. When all the data to be encoded are printed on the check, the control unit causes motor 32 to run continuously again, in consequence whereof in aligning station 52 this document gradually proceeds into the sphere of influence of the second portion of the transport mechanism.

Because, as already put forth, the driving and aligning rolls 20, 22, respectively, are driven by motor 32, the bill for the next transaction will initially, i.e., so long as the preceding check is being encoded, be fed into the device incrementally; when the encoding operation has been completed, this feeding in becomes continuous again and the new bill will be brought to a stop when its leading edge activates document sensor DS2. As the distance to be covered by the new bill from entry 18 to document sensor DS2 is much longer than the distance to be covered by the preceding check from encoding station 54 until past the point where the second portion of the transport mechanism gains control of the movement of the document, motor 32 stopping when the new bill reaches document sensor DS2 does not affect the movement of the check any more.

The requirement for motor 32 is that it should be able to control document movement and positioning with particular precision: it is expected that a bill is stopped immediately when its leading edge activates document sensor DS2, that a bill is carried past reading station 48 with a constant velocity, that a bill is stopped immediately when its trailing edge has covered a definite distance, for example, 5 cm, past document sensor DS2, that a check is stopped immediately when its leading edge has moved an accurately defined distance (between document sensor DS2 and just past the printing position of encoding station 54) past document sensor DS2 and finally that a check is incrementally fed past encoding station 54, each step length having to satisfy very close tolerance requirements. A stepping motor is used for motor 32, which may be controlled with extreme precision by means of pulses from control unit 28. To move a document a definite distance in respect of a reference point, such as a document sensor, it is only necessary for the control unit to have the stepping motor perform an accurately defined number of steps. Therefore the control unit is provided with facilities to deliver the correct number of pulses to the stepping motor for any case that may arise. For example, from a relevant register or storage a number may be read, which is subsequently loaded in a tally-down counter. Clock pulses are then gated to the tally-down counter and the stepping motor so long as the tally-down counter has not yet reached zero. Reaching the zero reading causes signaling in the control unit to the effect that the document has reached the desired position.

When a document has left the primary portion of the transport path driven by stepping motor 32 and is in the secondary portion of the transport path continuously driven by motor 50, it first reaches printing station 56. Printing station 56 may be a simple printing device, such as a wire printer, as the data to be printed need only be human readable. Under control of control unit 28 several data, such as the amount entered, group number, date of processing, etc., may be printed on the back of the documents, both bills and checks.

Such data are useful when dealing at a later date with possible complaints or requests for information of clients.

At a small distance past the printing position of printing station 56 there is a document sensor DS3. As soon as the leading edge of a document activates document sensor DS3, the latter signals this to control unit 28, which thereupon sequentially gates to the printing station all the commands required for printing the desired data. Thus printing station 56 prints a line of data on the back of each of the documents passing the station.

If the document leaving the printing station is a bill, it is further transported in the direction of the stackers without the need for further processing; however, if the document is a check, an endorsement is to be printed on the back thereof in endorsing station 58. The endorsing station comprises a rotating stamp, whose circumferential velocity is equal to the velocity of the document to be endorsed, and which is brought into contact with the document during one revolution. Normally an endorsement states the firm name and, if desired, the date of processing.

The timing of the endorsement printing may be determined in two ways. In the first, control unit 28 starts an internal timing circuit at the moment document sensor DS3 signals the appearance of the leading edge of a document, it being known to the control unit that this must be a check. In the second manner control unit 28 starts an internal timing circuit at the moment document sensor DS3 signals the disappearance of the trailing edge of a document, it being known to the control unit that a check is involved. It will be understood that the timing circuit for the second method will need a shorter running time than that for the first. When the timing circuit has reached the final state, e.g., a tally-down counter which is returned to zero by a sequence of clock pulses, control unit 28 issues the stamping command to endorsing station 58, which, consequently, after inking, brings the stamp into contact with the back of the passing check, releases the stamp for one revolution and restores it into the standby position to be ready for a following endorsement.

The placing of the endorsing stamp being noncritical, an accurate interrelation between the velocity of the check and the time in which the timing circuit reaches the final state is unnecessary. Therefore motor 50, driving the secondary portion of the transport path, may be a simple, continuously running a.c. motor. Also a slight slip between check and transport means in the secondary part of the transport path is unimportant as regards the endorsement.

As explained in the foregoing, motor 50 drives the secondary portion of the transport path. By means of driving belt 60 motor 50 drives a shaft with reduction wheels 62, which drive is transmitted, by means of belt 64, to two drums 68 and 70, coupled by means of a belt 66. The shaft with reduction wheels 62 may be provided with a handwheel for facilitating the removal of documents jammed in the secondary part of the transport path. Drum 70 drives a transport belt 72. Transport belt 72 is guided by freely rotating guide rolls 74 and 76 (FIG. 2A) and a slightly bent guide plate 78, and is tensioned by a freely rotating tensioning roll 79. Guide roll 76 transmits the movement of transport belt 72 to an intermediate transport belt 80. Intermediate transport belt 80 is guided by a freely rotating guide roll 82 and a slightly bent guide plate 84 and is tensioned by a freely rotating tensioning roll 86. Guide roll 82 transmits the movement of intermediate transport belt 80 to a drive belt 88 of secondary aligning station 52.

When the document leaves endorsing station 58, the feeding of the document is taken over by transport belt 72. The friction between document and transport belt is sufficiently large and that between document and bent guide plate 78 sufficiently small to render possible further transport of the document without any further guidance, such as a reference surface or gutter for the bottom edge of the document.

At a small distance before drum 68 there is a document sensor DS4. When the leading edge of a document activates document sensor DS4, it signals this to control unit 28, which thereupon either activates or does not activate the energizing mechanism 92, such as an electromagnet, of a stacker selector 90, in order to let the document pass to the first stacker pocket 14 or the second stacker pocket 16.

Each of the drums 68 and 70 is provided with a document tilting belt 94. Each document tilting belt is guided by a freely rotating guide roll 96 and a twisted guide plate 98 and is tensioned by a pretensioned pair of tensioning rollers 100. The function of the combination of document tilting belt 94 and twisted guide plate 98 is to bring the document from the vertical to the horizontal position, in order to make it possible to form a stack of documents. A document referred by the control unit to the second stacker 16, is clamped between transport belt 72 and document tilting belt 94 upon reaching drum 70 and is, thus fixed, carried around drum 70 up to the leading edge of twisted guide plate 98, where transport belt 72 bends away from the path followed by the document. Subsequently document tilting belt 94 shifts the document across twisted guide plate 98.

Guide roll 96 of document tilting belt 94 couples the movement thereof with a stacking belt 102. Stacking belt 102 has a substantially circular section and partially runs in a groove 104 in twisted guide plate 98, which groove is extended by means of two guide bars 106. The function of stacking belt 102 running partially sunk in the groove is to concave the document driven by this belt, so that it obtains great rigidity in the direction of movement. When the trailing edge of a document has reached the end of the guide bars 106, the document floats until the leading edge thereof bumps against a buffer block 108, and subsequently drops down onto a bottom 110 or on a stack of documents already present thereon. The length of a stacker pocket may be adjusted to the length of the documents to be processed by means of a lever 112.

Structure and operation of stacker pocket 14 are identical to those of stacker pocket 16, although, for clamping the document to be stacked against document tilting belt 94, an auxiliary belt 114 is provided, running on guide rolls 116 and tensioned and driven by part of the circumference of drum 68.

Figure 4:
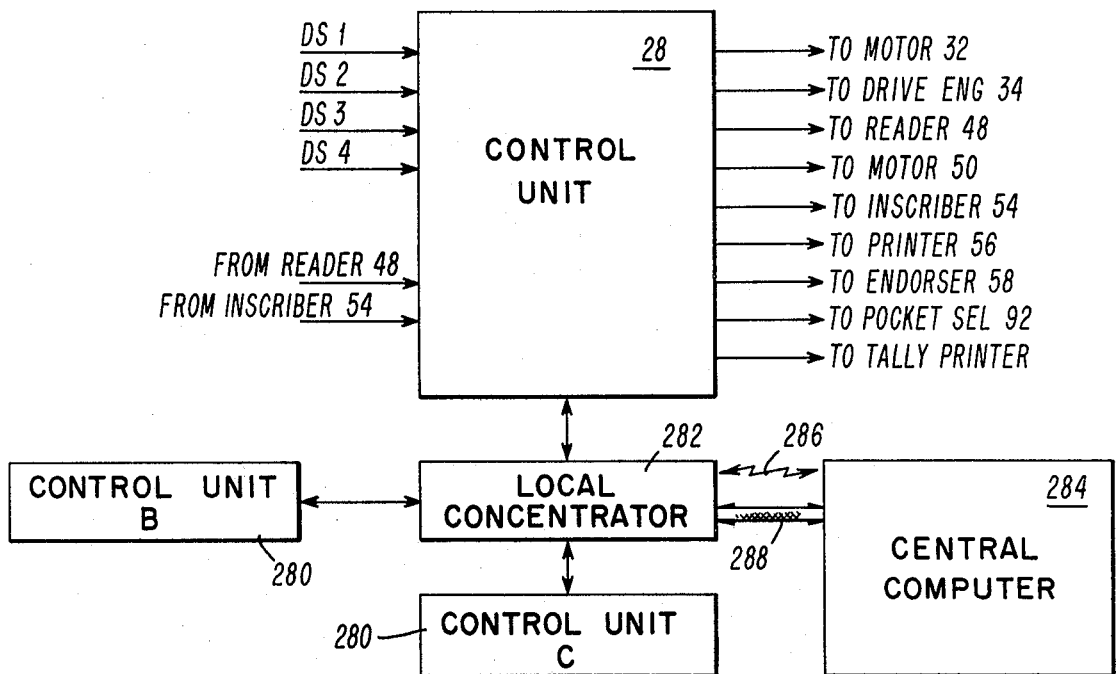
FIG. 4 is a block diagram of the interface between the control unit of the device according to the invention and a central computer.

FIG. 4 is a diagrammatic representation of the connections between control unit 28 and the various components of the document processing device as described in the foregoing.

Control unit 28 is coupled to a local concentrator 282. The local concentrator receives data from control unit 28, such as amounts owed and amounts paid, client number, article number, etc. The local concentrator furthermore comprises a storage, wherein the data received from the control unit are stored. The local concentrator may be connected to more than one control unit 280, in which case data received from those units are stored in different storage spaces, each assigned to a definite unit. Besides, the data are stored by group, a group being defined as a definite number, e.g., 250, checks with associated bills. As soon as the local concentrator has stored a definite number of fully processed groups, or at the end of an operative period, concentrator 282 transmits these data to a central computer 284. This transmission may be effected over long distances, such as by means of telephone lines (diagrammatically represented by interface 286), or by means of a connection to a computer channel (diagrammatically represented by cable 288) if the computer is located in the vicinity of the local concentrator.

Figure 5:
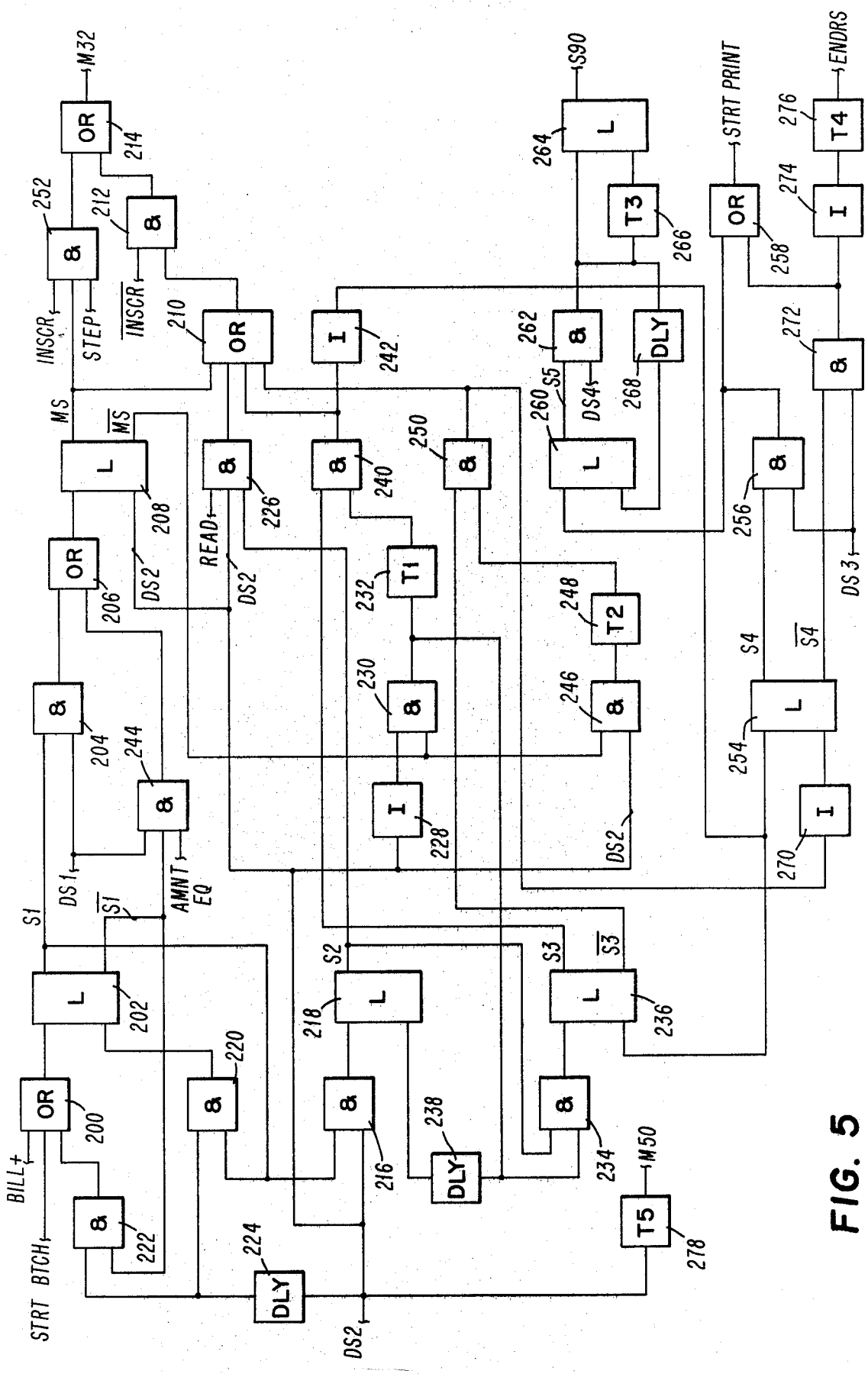
FIG. 5 is a schematic diagram of logical circuits for monitoring the documents in the primary and secondary portions of the transport.

FIG. 5 shows a schematic logic diagram of circuits in control unit 28 for controlling stepping motor 32. When starting the document processing device and/or when the operator begins the processing of a new group of documents and for this purpose depresses the appropriate key on the keyboard, a group start signal STRT BTCH appears at one input of OR gate 200; the output of OR gate 200 sets a first latch 202. The output signal S1 of latch 202 conditions one input of AND gate 204, the other input of AND gate 204 being conditioned when the first document of the new group, a bill, has been placed in input 18 (FIG. 2A) and document sensor DS1 has been activated. Via OR gate 206 the output signal of AND gate 204 sets motor start latch 208. The output signal MS of latch 208 conditions, via OR gate 210, one input of AND gate 212. The other input of AND gate 212 is conditioned by the INSCR signal of the control unit when there is no document to be encoded in encoding station 54 (FIG. 2A). The output signal of the now fully conditioned AND gate 212 energizes, by way of OR gate 214, stepping motor 32 (FIG. 2A). Thus the document placed in the input is fed into the processing device.

The disappearance of the activating signal of document sensor DS1 at the input of AND gate 204 does not affect the state of latch 208, so that the motor keeps running. When the leading edge of the document activates the second document sensor, the relevant signal DS2 resets latch 208, so that the stepping motor stops. Furthermore the signal of documents sensor DS2 conditions one input of AND gate 216, the second input of which had already been conditioned by the S1 signal of latch 202. The output signal of AND gate 216 sets a latch 218.

The outputs S1 and S1 of latch 202 are connected, by way of AND gates 220, 222, respectively, to the reset and set inputs, respectively, so that the appearance of signal DS2 causes, via a pulse delay circuit 224, latch 202 to switch alternately to the other state, i.e., from the "bill-state" (S1 high) to the "check-state" (S1 high) and vice versa.

Signal DS2 further conditions one input of AND gate 226, whose second input is conditioned by the S2 output signal of latch 218. The third input of AND gate 226 is conditioned by the READ signal of the control unit when it is ready to read data from the bill. Now the output signal of AND gate 226 energizes the stepping motor via OR gate 210, AND gate 212 and OR gate 214, so that the bill is carried past reading station 48 (FIG. 2A).

The disappearance of signal DS2 when the trailing edge of the bill leaves document sensor DS2 conditions, via an inverter 228, one input of AND gate 230, whose other input has been conditioned by the output signal MS of latch 208, reset by signal DS2. The output signal of AND gate 230 starts a timing circuit T1, reference character 232. It also sets, in unison with the output signal S2 of latch 218, a third latch 236 via AND gate 234, and resets, by way of delay circuit 238, latch 218.

Timing circuit 232 delivers an output signal so long as the zero reading has not yet been reached. The output signal of timing circuit 232 conditions one input of AND gate 240, whose other input is conditioned by output signal S3 of latch 236, which is set. Now the output signal of AND gate 240 energizes the stepping motor by way of OR gate 210, AND gate 212 and OR gate 214.

When timing circuit 232 reaches zero, the motor stops and latch 236 is reset via inverter 242. The document which has been read, the bill, is now at rest, leaving a distance of approximately 5 cm between document sensor DS2 and the trailing edge of the document.

Latch 202 being reset, the control unit now expects a check. The operator has keyed in the amount and the control unit has compared the amount read with the amount keyed in; when agreement has been established, a signal AMNT EQ appears, conditioning one input of AND gate 244. A second input of AND gate 244 is conditioned by output signal S1 of latch 202 which is reset. The third input of AND gate 244 is conditioned by signal DS1, delivered by document sensor DS1 when the check is placed in the input. By way of OR gate 206 the output signal of AND gate 244 sets motor start latch 208. The output signal MS of latch 208 again energizes, as described hereinbefore, stepping motor 32 by way of OR gate 210, AND gate 212 and OR gate 214.

When the leading edge of the check reaches document sensor DS2, the signal DS2 resets latch 208. The output signal of AND gate 246, conditioned by signal DS2 and output signal MS of latch 208 which is now reset, starts a timing circuit T2, reference character 248. Furthermore signal DS2 sets, via pulse delay circuit 224, latch 202 in the "bill-state".

Timing circuit 248 delivers an output signal so long as the zero state has not yet been reached. The output signal of timing circuit 248 conditions one input of AND gate 250, whose outer input is conditioned by the output signal S3 of latch 236, which is reset. Via OR gate 210, AND gate 212 and OR gate 214 the output signal of AND gate 250 now energizes the stepping motor.

When timing circuit 248 reaches zero, the motor stops. The document fed in, the check, is now stationary, its leading edge being located at a slight distance past the printing position of the encoding station. The preceding document, the bill, has in the meantime left the primary transport.

Output signal S1 of latch 202, which is set, and signal DS1, which appears when the next bill is placed in the input, condition AND gate 204, so that motor start latch 208 is set again. However, as the check waiting in the primary transport is to have the amount encoded thereon, the INSCR signal of the control unit is absent and instead a signal INSCR conditions an input of AND gate 252, whose other input is conditioned by the output MS of latch 208, which is set. The third input of AND gate 252 has a pulse signal (STEP) applied thereto.

The STEP signal originating from the control unit each time determines the period during which the stepping motor is energized. This period is set so that each time after the encoding station has printed an encoded character on the (stationary) check, the check is displaced a distance which is equal to the specified distance between the center lines of two successive characters.

The output signal of AND gate 252 energizes the stepping motor via OR gate 214.

After completion of the encoding of the check the INSCR signal disappears to be superseded by the INSCR signal, so that AND gate 212 takes over the function of AND gate 252 and the stepping motor starts running continuously again. From the moment onwards the sequence of the various switching states is the same as the sequence described with respect to the initial introduction of a bill. It will be evident that during the encoding of the check the bill placed in the input disappears incrementally in the processing device.

When one check is accompanied by more than one bill, the operator should signal this to the control unit. This is effected by depressing a function key, generating a signal "next document is also a bill" (BILL+). When more than one bill is associated with one check, the BILL+ key should be depressed for each bill following after the first.

When the control unit receives the signal BILL+, it switches on an adder wherein all the amounts read from the associated bills are added. The amount indicated on the check and keyed in by the operator is then compared with the sum of the amounts read from the bills. In printing station 56 (FIG. 2A) the control unit has furthermore one reference symbol only, such as an asterisk, printed on the back of all the bills and on the last one, in addition to the standard data, also the summed amount.

In the motor control circuit according to FIG. 5 the signal BILL+ is applied to the third input of OR gate 200. Thus latch 202, which was reset just after the leading edge of the preceding bill activated document sensor DS2, is reset by the output signal of OR gate 200.

It will be evident that the output signal of OR gate 214 does not energize stepping motor 32 (FIG. 2A) direct. The output signal of OR gate 214 may be used for controlling the supply of stepping pulses, continuously supplied by a pulse source, not shown, to the stepping motor.

FIG. 5 also shows the logic circuits for monitoring documents in the secondary portion of the transport path. This portion of the transport is driven by continuously rotating motor 50 (FIG. 2B).

A fourth latch 254 is set by the output of inverter 242, appearing when a bill has stopped in the primary transport with its trailing edge approximately 5 cm past document sensor DS2. Output S4 of latch 254 (set) conditions one input of an AND gate 256, whose other input is conditioned by signal DS3 of document sensor DS3, i.e., when the leading edge of the bill has just passed printing station 56 (FIG. 2A). The output signal of AND gate 256 supplies, via an OR gate 258, to the control unit a command (STRT PRINT) to start printing the required data on the back of the bill.

Furthermore the output signal of AND gate 256 sets a fifth latch 260. Output S5 of latch 260, which is set, conditions one input of AND gate 262, whose other input is conditioned by signal DS4 of document sensor DS4, i.e., when the leading edge of the bill has come just before stacker selector 90 (FIG. 2B). The output of AND gate 262 sets selector control latch 264. The output signal S90 of latch 264 energizes electromagnet 92 (FIG. 2B) of stacker selector 90, to switch the selector and to cause the bill to be guided into the first stacker pocket 14. The output of AND gate 262 also starts a timing circuit T3, reference character 266, which upon reaching zero delivers a pulse resetting latch 264. The duration of timing circuit 266 is set so that latch 264 is reset only when the trailing edge of the bill has passed stacker selector 90. Finally the output of AND gate 262 resets, via pulse delay circuit 268, latch 260.

In the meantime latch 254 has been or is reset via inverter circuit 270 by the output of AND gate 250 disappearing, i.e., when a check has stopped at encoding station 54 (FIG. 2A). (If the next document had been a bill instead of a check, latch 254 would not be reset.) Output S4 of latch 254, which is reset, conditions one input of AND gate 272, whose other input is conditioned by signal DS3 of document sensor DS3, i.e., when the leading edge of the check has just passed printing station 56 (FIG. 2A). By way of OR gate 258 the output of AND gate 272 supplies to the control unit the command (STRT PRINT) to initiate printing the required data on the back of the check.

The disappearance of the output of AND gate 272 starts, via inverter circuit 274, a timing circuit T4, reference character 276, which upon reaching zero signals (ENDRS) to the control unit to start endorsing station 58 (FIG. 2A). Then the check is in the correct position for endorsement.

Latch 260 not being set, the selector will not be switched when the check reaches document sensor DS4, so that the check disappears into the second stacker pocket 16.

In order to prevent useless running of the secondary portion of the transport path when the document processing device is switched on but not used, measures have been taken to switch off motor 50 when during a definite time no document has been processed. A timing circuit T5, reference 278, is restarted each time by signal DS2 of document sensor DS2. So long as timing circuit 278 does not reach zero, motor 50 remains energized. The running time of timing circuit 278 amounts to approximately twelve seconds, for example. This timing being by no means critical, a monostable multivibrator may be used for circuit 278.

Figure 6:
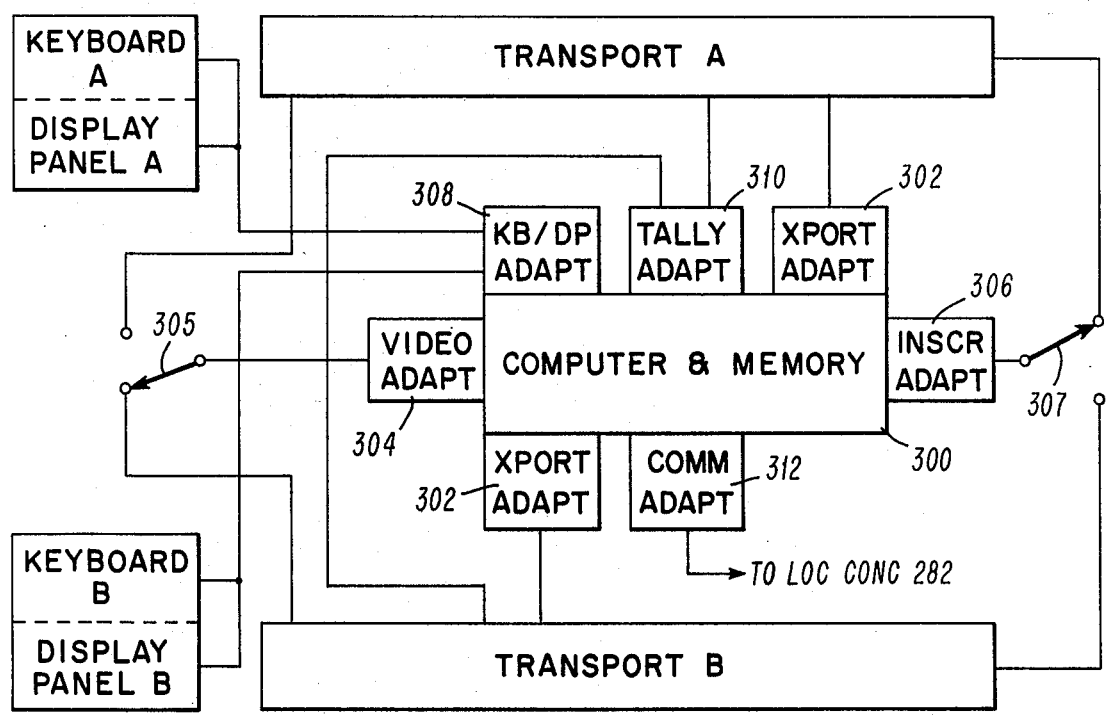
FIG. 6 shows the interface between the control unit with the transport mechanism and the processing stations of the device according to the invention.

FIG. 6 shows in block diagram form the manner in which one control unit 28 controls two transport paths with the associated processing stations. From FIG. 1 it is evident that the two transport paths are accommodated in one housing. The central portion of the housing also comprises the control unit itself.

Control unit 28 comprises a small computer with an associated storage 300. The interface between computer 300 and the transport paths, the various processing stations, the keyboard and the displays is effected by means of adapters; the interface between the control unit and the local concentrator (FIG. 4) is likewise effected by means of an adapter.

For each of the transport paths there is provided a transport adapter 302, which in addition to monitoring the movement of the documents also serves to control the printing and endorsing station. Transport adapters 302 comprise among other things the circuits according to FIG. 5.

For both transport paths together there is provided one video adapter 304, connecting either the reading station of transport path A, or that of transport path B to computer 300. Video adapter 304 comprises at least circuits for digitalizing video data. As reading information from a bill takes only a short time, approximately 0.5 seconds, a document reaching the reading station (at DS2) in one of the transport paths just after a document in the other transport path has likewise arrived at the reading station, will have to wait a short time until the first document has been read.

For both transport paths together there is likewise one encoding adapter 306, connecting either the encoding station of transport path A, or that of transport path B to computer 300. The encoding of data on a check taking only a very short time, a document reaching the encoding station (DS2 + T2) in one of the transport paths just after a document in the other transport path has likewise arrived at the encoding station, will have to wait a short time, until the first document has been encoded.

In FIG. 6 the alternate availability of the video-and encoding-adapter to the two transport paths is symbolically represented by switches 305, 307, respectively.

A keyboard- and display-adapter 308 connects the two keyboards and the displays to computer 300. The keying in of data being an extremely slow process as seen by a computer, and the writing of data in a display requiring only very little time and such data not requiring modification for a relatively long time, one adapter will suffice.

FIG. 6 furthermore shows printer or tally adapter 310. Printer adapter 310 connects computer 300 to a journal printer, not shown, in each of the two document processing devices, said journal printer producing a journal paper tape for each group of documents processed. For example, all the amounts encoded on the checks and the group total are printed, the journal paper tape is torn off after a group has been processed and sent to the bank with the checks from that group.

Finally FIG. 6 shows a communication adapter 312, coupling the computer to the local concentrator 282 (FIG. 4). Via the communication adapter computer 300 passes on the data read from the bills to the local concentrator and receives data from the local concentrator, or via the latter from central computer 284.

While the invention has been particularly shown and described with reference to a preferred embodiment thereof, it will be understood by those skilled in the art that various changes in form and details may be made therein without departing from the spirit and scope of the invention.

We claim:

1. A document processing device for performing individual operations on at least two different kinds of documents, such as bills, and associated vouchers or instructions for payment such as checks, provided with transport means for carrying documents of the first kind, the bills, continuously past at least a reading station, and with transport means for incrementally moving documents of the second kind, the checks, past at least an encoding station, characterized in that a single transport path for at least two kinds of documents is provided, which is equipped with a single transport drive for selectively, continuously or intermittently moving documents past processing stations disposed along the transport path, such as a reading station, an encoding station, a printing station and an endorsing station, and a control unit for selectively controlling, in dependence on the alternately different documents introduced, the various processing stations and the associated movement of the documents.

2. A document processing device as in claim 1, further characterized in that in definite places the transport path is provided with document sensors for signaling to the control unit that a document in the transport path has reached or leaves such a place, and the control unit comprises timing means and latch circuits which, controlled by the outputs of the document sensors and internal logical signals of the control unit, determine beginning and duration of the operation of the various processing stations and the movement of the documents in the transport path.

3. A document processing device as in claim 2, further characterized in that the control unit comprises means indicating the kind of document, switching in response to the outputs of the relevant document sensors for signaling that a document of the other kind will follow after the document which has just passed.

4. A document processing device as in claim 3, provided with a keyboard, and characterized in that the keyboard comprises a function key, which, if actuated, delivers to the control unit a signal resetting at least the first of the means indicating the kind of document, if it has already been switched by the preceding document or blocking such switching if the preceding document had not yet effected the switching.

5. A document processing device as in claim 4, provided with a stacker for each kind of the documents to be processed, and characterized in that a stacker pocket selector is provided, the energization setting the selection thereof being controlled by the means indicating the kind of document so that only documents of one kind are deposited in the same stacker pocket.

6. A document processing device as in one of the foregoing claims, further characterized in that the control unit comprises a comparator for comparing the amount read by the reading station from a document of the first kind, such as a bill, with an amount which the operator has read from the associated document of the second kind, such as a check, and has entered into the control unit by means of the keyboard, the comparator output signaling agreement causing the control unit to feed the document of the second kind placed in the input of the transport path into the device.

7. A document processing device as in one of the preceding claims, further characterized in that the single transport path comprises two portions which are in line, the first portion, driven by the single transport drive controlled by the control unit, comprising the input, said first portion of the transport path having arranged therealong at least the reading station and the encoding station past which, dependent of the setting of the means indicating the kind of document in the control unit, documents of the first kind (bills) are fed in continuous movement or documents of the second kind (checks) are fed incrementally.

8. A document processing device as in claim 7, further characterized in that for the first portion of the single transport path the single transport drive controlled by the control unit is a stepping motor, selectively imparting to the first portion of the transport path either a continuous or an intermittent movement.

9. A document processing device as in claim 7, further characterized in that the single transport drive of the second portion of the single transport path, alongside which are disposed at least the printing station and the endorsing station and which ends, by way of the stacker pocket selector in the stacker pocket, is a continuously energized motor.

10. A document processing device as in claim 7, 8 or 9, further characterized in that a document aligning station is disposed between the first and the second portion of the single transport path.

11. A document processing device as in claim 10, further characterized in that the aligning station is driven by the continuously energized drive motor of the second portion of the single transport path.

* * * * *